Sept. 15, 1970  TOSHIO ITO ET AL  3,529,210
CURRENT LIMITING CIRCUIT
Filed Feb. 26, 1968

INVENTORS
TOSHIO ITO
TOSHIO MIYAMOTO
YUTAKA MURAI
YUICHI WADA

BY *Sughrue, Rothwell, Mion, Zinn & Macpeak*

ATTORNEYS

United States Patent Office 3,529,210
Patented Sept. 15, 1970

3,529,210
CURRENT LIMITING CIRCUIT
Toshio Ito, Tsohio Miyamoto, Yutaka Murai, and Yuichi Wada, Amagasaki-shi, Japan, assignors to Mitsubishi Denki Kabushiki Kaisha, Tokyo, Japan
Filed Feb. 26, 1968, Ser. No. 708,406
Claims priority, application Japan, Feb. 28, 1967 (utility model), 42/16,746
Int. Cl. H02h 3/00
U.S. Cl. 317—20      2 Claims

ABSTRACT OF THE DISCLOSURE

A current limiting circuit using a current limiting device of a self-restoration type wherein a current limiting operation by evaporation of an alkali metal is utilized. The alkali metal present in liquid or solid state at ordinary temperatures is contained in a casing as a current limit material, a switch is installed parallel to the current limiting device which performs a current limit operation due to evaporation of the alkali metal caused by flow of a short-circuit current.

CROSS REFERENCE TO RELATED APPLICATION

Copending application Ser. No. 708,406, now Pat. No. 3,453,490, filed Feb. 26, 1968, which claims priority from Japanese application No. 11,942/67, and which has the same applicants as this case, discloses a current limit device suitable for use in this invention.

BACKGROUND OF THE INVENTION

In general, when the load of a circuit system increases the normal current of the circuit also increases. But in such a case, both the resistance of the current limiting device at ordinary temperatures and the generation of heat due to a conducting current become large. Thus, it sometimes becomes difficult to conduct the normal current through the current limiting equipment.

When a plurality of circuit breakers are utilized for connection between same systems or different systems, and especially when electric power is exchanged between different systems, so-called selective breaking is preferably performed for security and stability of power transmission. Selective breaking is performed by selecting and operating the one required circuit breaker, rather than operating all the circuit breakers in the system, which would cause system instability. If selective breaking is not performed, there are possibilities of causing discord between systems, because individual current limiting devices independently perform a current limit operation without reference to stability of the power transmission system as a whole.

The disclosed invention is a current limiting circuit wherein switches are installed in parallel with the current limiting device to eliminate such defects as stated above. The ordinary electric current bypasses to these switches and thereby conduction is made easy. Moreover, selective breaking of the circuit can also be performed by controlling contact parting time of these switches.

In selective breaking, only the disconnected switch and the current limiting device connected in parallel with the switch operate to limit current. As the other current limiting devices are shorted across by their parallel switches, they do not operate to limit current. As the other current limiting devices are shorted across by their parallel switches, they do not operate to limit current. It is also preferable to connect another switch in series with the parallel combinations of switches and current limiting devices to break the current, as limited by the current limiting devices, as a last step.

SUMMARY OF THE INVENTION

This device is a current limiting circuit for protecting a system by limiting big electric current which may be dangerous to the system, such as a short-circuit current or an overload current. Because as the load on the circuit system increases, normal electric current increases, the disclosed circuit is devised so that difficulty of conduction due to increase of the resistance of the ccurrent limiting device at ordinary temperatures is prevented. Selective breaking, which breaks the circuit at an optional time, can be performed also.

DESCRIPTION OF THE PREFERRED EMBODIMENTS

Figure 1:
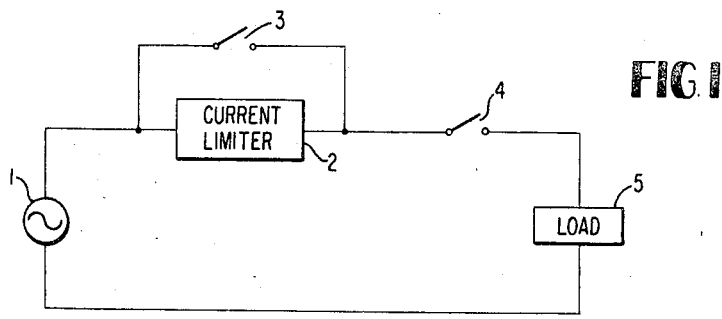
FIG. 1, FIG. 2 and FIG. 3 are circuit diagrams which show embodiments of this device. The same sign in separate drawings shows the same or a corresponding part.

FIG. 1 shows an embodiment of the device in which an alternating current power source 1, a current limiting device 2, a switch 3 connected in parallel with said current limiting device 2, another switch 4 connected in series with said current limiting equipment 2, and a load 5 are connected in the circuit illustrated.

It is found that in such a system a conducting current in steady state is supplied from the AC power source 1 to the load 5 through switches 3 and 4. If a short circuit accident has occurred, first the switch 3 is opened. This causes the short circuit current to pass into the current limiting device 2. After sufficient current limiting of this short circuit current by means of current limiting device 2, the switch 4 is opened. Consequently, in normal condition, even if the circuit load increases, conduction can take place easily.

Open-circuit operation of these switches 3 and 4 can be carried out by means of ordinary switches known as circuit breakers and so on.

In such a construction, by properly selecting the instantaneous maximum value of the current when current limiting operation of the current limiting device 2 is commenced, not only a short circuit current but a rated current can be limited by open-circuiting switch 3. That is, in case where the instantaneous maximum value of the current ic at which current limiting operation is to be commenced is 1000 a., the rated current is 2000 a., the current limiting device 2 does not operate since the ordinary rated current is bypassed to the switch 3 connected in parallel with the current limiting device 2. But since 2000 a. of the rated current flow through this current limiting device 2, when at an optional time the switch 3 is opened by means of hand operation or the like, this device 2 begins current limiting operation and interrupts also the rated currrent. Accordingly, the duty of switch 4 to break the load current can be remarkably reduced.

Further, as stated above, a plurality of breaking means are used for connection between the same systems or different systems, particularly for exchange of electric power between different systems. So-called selective breaking is performed for security and stability in power transmission. Also in the case when the switch is installed in parallel with the current limiting equipment like this device, and the switch is opened circuit at a predetermined time, the one device which requires breaking operation among a plurality of such current limiting devices can be selectively picked out. The remaining current limiting devices are shorted across by their parallel switches and do not then operate to limit current. Among the plurality of current limiting devices only the one needed in the breaking operation is selectively operated, thus preventing discord of systems.

Figure 2:
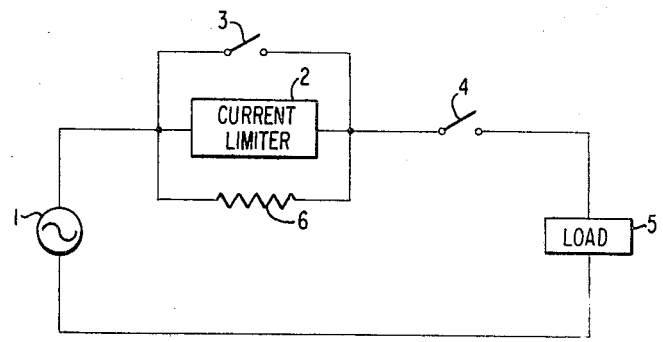

FIG. 2 shows another embodiment of this device, and besides the elements in FIG. 1, another parallel element, i.e. a resistance 6, is connected across the current limiting device 2. By so connecting this parallel resistance 6, generation of abnormal transient voltage at the time of current limiting operation of the current limiting device 2 can be prevented.

And said circuit in FIG. 1 and FIG. 2, current limiting is performed by the current limiting devices 2 after open-circuit of the parallel switch 3. The limited current is interrupted by the series switch 4. After a certain predetermined no-voltage time T (in general $\frac{1}{20}$–$\frac{1}{25}$ second) the limited current is again conducted and power transmission is attempted. Reclosing in this case is in general performed by the series switch 4, after closing of the parallel switch 3. In some special cases, for example, in case surge current is considered to be harmful, reclosing is performed by closing the parallel switch 3, after closing the series switch 4. However, in case the short-circuit state is still maintained after reclosing has been done like this, the current breaking must be done again. In this case when, within no-voltage time T, the current limiting device is restored to the initial conducting condition, current limit breaking is repeatedly performed by the same operation as stated above. But in the case where a current limiting device having large heat capacity is demanded, the time constant of restoration becomes larger than no-voltage time T, so that frequent current limit breaking does not need to be performed. Thus, in such a circuit system, high speed reclosing and rebreaking are required for security and stability.

Figure 3:
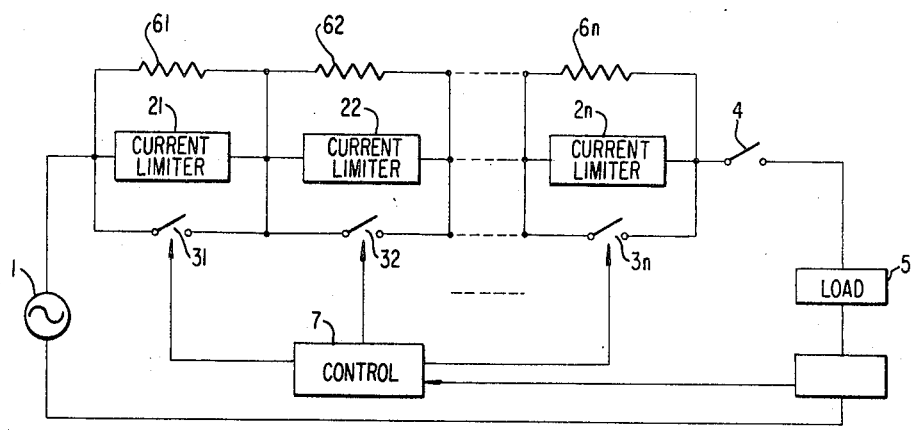

FIG. 3 shows an embodiment of this device wherein high speed reclosing and rebreaking can be performed. Element 1 is an AC power source, elements 21, 22 . . . 2n are current limiting devices, elements 31, 32 . . . 3n are switches connected in parallel respectively to said current limiting devices 21, 22 . . . 2n, elements 61, 62 . . . 6n are resistances for protection of abnormal transient voltages and are respectively connected in parallel to the current limiting devices 21, 22 . . . 2n, element 4 is a series switch, element 5 is a load and element 7 is a control mechanism which issues a breaking order to the parallel switches 31, 32 . . . 3n if short-circuit accidents have occurred.

In such a system, at first the parallel switches 31, 32 . . . 3n and the series switch 4 are closed. When, because of the short-circuit accidents the operation mechanism 7 receives the breaking order, the switch 31 is first opened by the current limiting device 21 and interrupted by the series switch 4. Then, if a short-circuit state is still maintained as before, even though the parallel switch 31 and the series switch 4 have been reclosed, the operation mechanism 7 opens the switch 32, and current limit operation is performed by the current limiting device 22. Hereafter similar operations are repeated and the Nth switch 3n is opened. If a short-circuit state is still maintained even after switches 3n and 4 have been reclosed, then the switch 31 is opened again, and current limiting is done by the current limiting device 21. In this case, n, the number of current limiting devices 21, 22 . . . 2n connected in series, must be chosen in such a manner that at the time after the Nth current limiting device 2n has acted, the first current limiting device just returns to the initial conducting state.

As mentioned above, according to this invention, an increase of circuit capacity conduction is also easily possible by merely installing the switches parallel to the current limiting equipment. That is, when the switches are closed in parallel with the current limiting devices, these devices do not operate and thus do not limit the current flow. Also, by controlling the contact parting time of the parallel switch, the system can be used for selective current limiting operations and the opening time of current limiting operations can be chosen at will. Moreover, in case current limiting devices having a large heat capacity are required, current limit breaking can be performed by connecting in series several stages of these parallel circuits. For security and stability, the circuit becomes very advantageous.

What is claimed is:

1. A current limiting circuit comprising: (a) a plurality of series-connected current limiting devices comprising a metal which is in the liquid state, (b) a resistor connected in parallel with each of said current limiting devices, (c) a switch connected in parallel with each of said current limiting devices to selectively control each of said current limiting devices, and (d) an additional switch connected in series with said plurality of current limiting devices.

2. A current limiting circuit as set forth in claim 1 wherein said current limiting devices are of a number such that a first current limiting device will be restored to an initial conducting state during operation of a final current limiting device and wherein said first current limiting device is driven to its full operating state after termination of the operation of said final current limiting device.

References Cited

UNITED STATES PATENTS

| | | | |
|---|---|---|---|
| 1,338,334 | 4/1920 | Slepian | 317—11 |
| 1,563,833 | 12/1925 | Christensen | 200—144 |
| 1,816,168 | 7/1931 | Berthold | 317—11 X |
| 3,436,600 | 4/1969 | Salo | 317—20 |

JAMES D. TRAMMELL, Primary Examiner

UNITED STATES PATENT OFFICE
CERTIFICATE OF CORRECTION

Patent No. 3,529,210          Dated September 15, 1970

Inventor(s) TOSHIO ITO ET AL.

It is certified that error appears in the above-identified patent and that said Letters Patent are hereby corrected as shown below:

At page 1, column 1, lines 27-28, kindly delete "708,406, now Pat. No. 3,453,490" and substitute therefor:

--708,048, now Pat. No. 3,501,730--

Signed and sealed this 30th day of March 1971.

(SEAL)
Attest:

EDWARD M. FLETCHER, JR.                WILLIAM E. SCHUYLER, JR.
Attesting Officer                      Commissioner of Patents